United States Patent [19]

Fiske, Jr.

[11] 4,286,687
[45] Sep. 1, 1981

[54] AIR GUN FIRING SENSOR APPARATUS AND SYSTEM

[75] Inventor: Augustus H. Fiske, Jr., Redding, Conn.

[73] Assignee: Bolt Associates, Inc., Norwalk, Conn.

[21] Appl. No.: 87,659

[22] Filed: Oct. 24, 1979

[51] Int. Cl.$^3$ .............................................. G01V 1/137
[52] U.S. Cl. .................................... 181/120; 181/119; 367/114; 367/157; 73/649; 310/338
[58] Field of Search ............... 367/144, 149, 157, 180, 367/188; 181/119, 120; 73/649; 310/338

[56] References Cited

U.S. PATENT DOCUMENTS

| | | | |
|---|---|---|---|
| 3,548,314 | 12/1970 | Mitchell | 310/338 |
| 3,561,831 | 2/1971 | Alibert et al. | 310/338 |
| 4,106,585 | 8/1978 | Huzier | 181/120 |
| 4,210,222 | 7/1980 | Chelminski et al. | 181/107 |

*Primary Examiner*—Nelson Moskowitz
*Attorney, Agent, or Firm*—Parmelee, Johnson, Bollinger & Bramblett

[57] ABSTRACT

An air gun firing sensor apparatus and system are provided for determining the instant of firing of an air gun by sensing pressure changes within the air gun when it is being fired. A pressure-change-sensitive transducer assembly is inserted into a socket in the housing of a solenoid-controlled valve of an air gun with a passage from the air gun communicating with the transducer for transmitting to the transducer a pressure surge occurring within the air gun whenever it is fired. The transducer assembly has a cylindrical casing with a head mounted at one end. The head includes a plurality of spaced recesses which are adapted to communicate with the passage leading from the air gun. A pressure-sensitive transducer is mounted in the head wall between and adjacent to these recesses, in effect being sandwiched in the head wall between these recesses with the transducer extending parallel to the recesses, whereby a pressure surge occurring simultaneously in the recesses is transmitted through the head wall to the transducers, being transmitted in a direction transverse to the axes of the respective recesses. Accordingly, a pressure pulse produced by the firing of the air gun squeezes the portions of the head wall between these recesses inwardly applying pressure to the transducer which generates a voltage indicative of the instant of firing of the air gun being monitored.

15 Claims, 9 Drawing Figures

AIR GUN FIRING SENSOR APPARATUS AND SYSTEM

BACKGROUND OF THE INVENTION

This invention relates to an air gun firing sensor apparatus and system for monitoring the firing of an air gun used for the generation of seismic energy in a medium for determining the actual instant of firing of the air gun.

In seismic surveying, air guns are utilized to generate powerful seismic energy impulses in order to investigate subsurface geological conditions and formations in the earth. For this purpose, one or more such air guns are each charged with pressurized gas, usually compressed air, which is temporarily stored in them. At the desired "shot" instant, the air guns are fired, and the pressurized gas is abruptly released into the surrounding medium. In this manner, powerful seismic energy impulses are generated capable of penetrating deeply into subsurface material to be reflected and refracted by the various geologic strata and formations. The reflected and refracted impulses are sensed and recorded to provide information and data about the geological conditions and formations.

For many applications, in both marine and land seismic exploration, it has been found advantageous to generate a plurality of seismic energy impulses from an array of air guns in order to provide a composite seismic signal of predetermined amplitude and frequency content and in spacial or array arrangements. For marine seismic surveying an array of air guns having various firing chamber volumes may be utilized in order to produce a composite seismic signal having a predetermined frequency distribution as air guns of different firing chamber volumes generate seismic energy impulses with different frequency spectra. In such applications, as well as those in which air guns are repetitively fired or fired in sequence, it is desired to control the timing of the solenoid control valves which are used to trigger the firing of the respective air guns.

For further background on air guns and solenoid valves reference may be made to U.S. Pat. Nos. 3,249,177; 3,379,273; 3,779,335; 3,588,039; 3,653,460; 3,997,021 and 4,038,630.

In the past, attempts have been made to synchronize the timing of the solenoid-controlled valves which trigger the individual air guns. However, the time at which a solenoid plunger actually becomes actuated in response to an electrical signal will vary with each valve, and then there are further variables caused by the mechanical structure of each air gun, such as dimensional tolerance variations, wear of parts, slight differences in shuttle mass, different frictional drag of moving parts, and so on. When the individual air guns are not actually operating in accordance with the prescheduled precisely timed relationship, then the downgoing seismic waves are not in accordance with the predetermined survey program, and less than optimum results are obtained. For example, if the survey program calls for all of the air guns to fire in synchronism, and they are not synchronized, the downgoing seismic waves are misaligned. Misalignment may cause reduction in total amplitude of the downgoing seismic waves or cause the generation of seismic waves with undesirable frequency spectra, or both, resulting in data collection with reduced penetration and resolution.

A solution to the problem of inaccurate firing ("shot") instant as set forth in U.S. Pat. Nos. 4,034,827 and 4,047,591 assigned to Texas Instruments, Incorporated has been to sense movement of a gas-releasing shuttle within each air gun by magnetic, electromagnetic or electrostatic field effects to establish the precise instant of firing of each individual air gun. The firing signals applied to the respective air gun solenoid valves are then delayed or advanced relative to each other in subsequent firings to properly synchronize or sequence the firings of the respective air guns. In those patents, the air guns are modified in order that a field such as a magnetic field be set up. The air guns are further modified in order that variations in that field caused by movement of the shuttle can be detected.

In the final paragraph of each of the above patents, possible arrangements for producing a magnetic, electromagnetic or electrostatic field and sensing variations in that field were listed. A primary disadvantage of each of the embodiments suggested in these patents is that one or more complex modifications of the air gun itself is required. Such modification of an air gun to include means for generating a magnetic, electromagnetic or electrostatic field plus means to sense variations in that field are generally complicated procedures which cannot be accomplished by an operating crew, and even such modification of air guns yet to be manufactured is costly. Further, any repairs by an operating crew to a sensor which is built into the air gun is time-consuming and costly.

In copending applications Ser. Nos. 917,792 (issued as U.S. Pat. No. 4,210,222 on July 1, 1980) and 917,794, both filed on June 22, 1978 and assigned to the same assignee as the present application there are described how and why a pressure transducer can be used advantageously to monitor the firing of individual air guns being used in an array of air guns for seismic surveying. The application Ser. No. 917,794 entitled "Method and Apparatus for Monitoring and Controlling a Plurality of Air Guns for Seismic Surveying" describes a solenoid valve housing provided with a socket having a pressure sensor transducer mounted therein. A passage extending from the socket through the housing communicates with a passage leading into the air gun for transmitting to the transducer pressure variations occurring within the air gun when the gun is fired. The flat circular end face of the pressure-sensitive transducer is positioned transversely with respect to the axis of the passage leading from the air gun. An enormous pressure surge is applied against the flat end of the transducer when the air gun is fired.

Also, when the air gun is fired, there are large axial acceleration forces involved as the air gun recoils during the fast acceleration of the shuttle at the instant of firing. Accordingly, the transducer must be able to withstand tremendous acceleration forces when the air gun is fired. In order to handle such acceleration, the pressure-sensitive transducer is formed by multiple wafers of piezoelectric material with reverse polarities, thereby being non-responsive to axial acceleration. These wafer elements are electrically connected so that when actuated by pressure changes from the air gun, the voltages generated by the individual wafers are additive. The provision of multiple layers or wafers for the pressure-sensitive transducer are more difficult to fabricate, are subject to fracture and are less rugged than single crystal sensors. The present invention is directed to an improvement of the apparatus described in the aforesaid application.

As used herein, the term "gas" is used in a broad sense to include any compressible gaseous fluid which may be utilized in an air gun, and it includes (but is not limited to) air, steam, nitrogen, carbon dioxide, gaseous products of combustion, and mixtures thereof.

SUMMARY

An object of this invention is to provide a sensor for sensing movement of an air gun shuttle to signal the instant of firing of that air gun, such sensor requiring little if any modification to the basic air gun structure and allowing for ease in replacement of the sensor.

It is an object of the present invention to provide a new and improved pressure-sensitive transducer assembly for determining the instant of firing of an air gun which is rugged, requires no complex modification to the basic air gun structure, and provides ease in replacement of the sensor assembly.

A further object of this invention is to provide a new and improved pressure-sensitive transducer assembly for an air gun which is capable of withstanding huge acceleration forces generated during the firing of the air gun and can provide accurate and reliable information with respect to the shot instant when the air gun is fired.

In carrying out this invention in one illustrative embodiment thereof, a pressure-sensitive transducer assembly for determining the instant of firing of an air gun is provided having a casing with a head wall included in one end of the casing. Recess means are positioned in the head wall which recess means are adapted to communicate with a passage leading into the air gun. A pressure-sensitive transducer is mounted in the head wall adjacent said recess means with the transducer extending parallel to the recess means, whereby pressure surges in the recess means transmitted thereto through the passage from the air gun are applied through the head wall to said transducer transverse to the axis of the recess means thereby squeezing the transducer, which generates a signal in response to the pressure increase.

By mounting the neutral axis of the pressure transducer parallel to the axis of the recess means, the transducer is capable of withstanding and not responding to the enormous acceleration generated on the firing of the air gun.

Advantageously, the present structure permits dispensing with the utilization of multiple layered wafers which are connected in opposition in order to cope with the acceleration problem. Accordingly, the present invention permits the use of a single crystal which is accurate, reliable and rugged in construction.

BRIEF DESCRIPTION OF THE DRAWINGS

The invention, together with further aspects, objects and advantages thereof, will be more clearly understood from a consideration of the following description taken in connection with the accompanying drawings.

DESCRIPTION OF THE PREFERRED EMBODIMENTS

The pressure-sensitive transducer in accordance with one embodiment of the present invention constitutes an improvement over such an assembly shown and described in the aforesaid patent application Ser. No. 917,794 and accordingly may be mounted in a similar fashion in a socket in a solenoid valve housing. Such a socket communicates with a passage leading into an air gun for sensing a sudden pressure surge in the air gun which occurs upon the firing of the air gun for monitoring the instant of such a firing. Accordingly, the particular structures of the solenoid valve and of air guns which do not constitute a part of the present invention are not illustrated in order to simplify the following description. All that is necessary for a clear understanding of the present invention is to know that the pressure-sensitive transducer assembly is adapted to have its head end be in communication with a fluid in which pressure surges occur which are to be monitored by the assembly.

Figure 1:
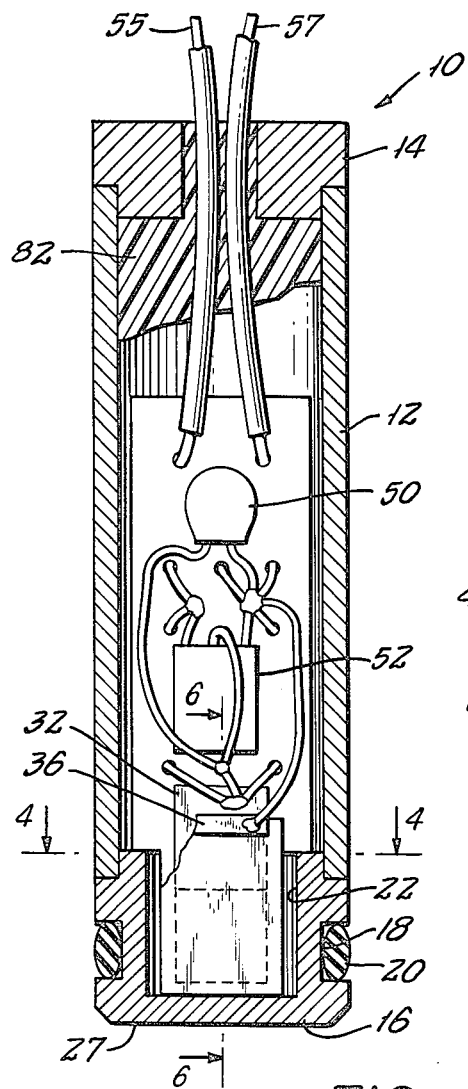
FIG. 1 is an axial sectional view, with certain parts shown broken away for illustration, of the pressure-sensitive transducer assembly embodying the present invention.

Referring now to FIG. 1, the pressure-sensitive transducer assembly, indicated generally by the reference numeral 10, includes a sleeve casing 12 enclosed on its signal-output end by a cap 14 and enclosed on its head end by a cylindrical head wall 16. The sleeve casing, cap and cylindrical head wall, 12, 14 and 16, respectively, are fabricated of a suitable material such as black anodized duralumin A17075-T6 which is rugged and which provides protection against corrosion for such applications as use in marine seismic surveying.

The head wall 16 has an annular recess 18 encircling it containing an O-ring seal 20 which prevents fluid flow past the assembly 10 in the socket in which it is mounted for example a socket in the solenoid valve housing on an air gun (not shown).

Figure 2:
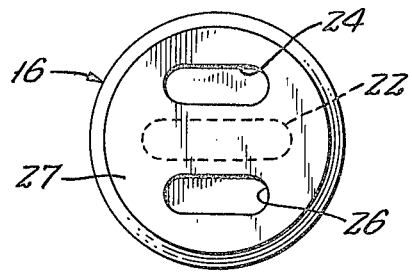
FIG. 2 is a plan view of the head end of the pressure-sensitive transducer assembly of FIG. 1.
Figure 4:
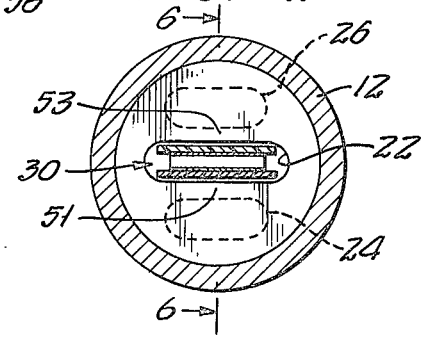
FIG. 4 is a cross-sectional view taken along line 4—4 of FIG. 1.
Figure 6:
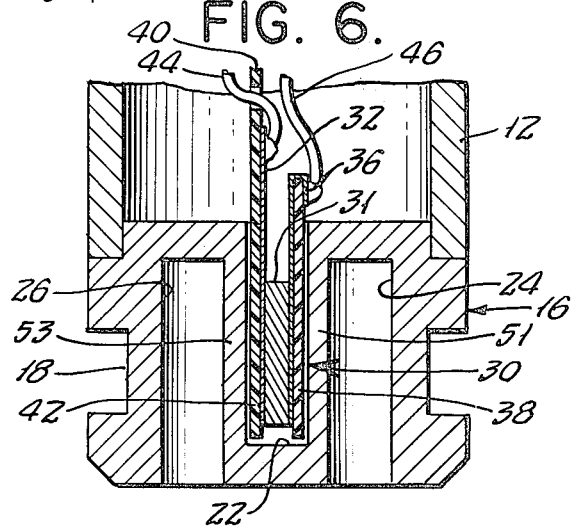
FIG. 6 is an enlarged axial sectional view taken along line 6—6 of FIGS. 1 and 4 and seen from a direction perpendicular to what is shown in FIG. 1.

As will best be seen in FIGS. 2 and 4 and particularly in FIG. 6, the head wall 16 includes an axial downwardly extending recess 22 which is flanked on each side by axial upwardly extending recesses 24 and 26. The upwardly extending recesses 24 and 26 extend from the end face 27 of the head wall 16 and are adapted to be in communication with a passage which leads into a chamber of an air gun in which a sudden pressure change occurs at the instant of firing. The downwardly extending axial recess 22 extends through the top of the head wall. This recess 22 is located between the two recesses 24 and 26, but it does not extend completely through the head wall 16.

Figure 3:
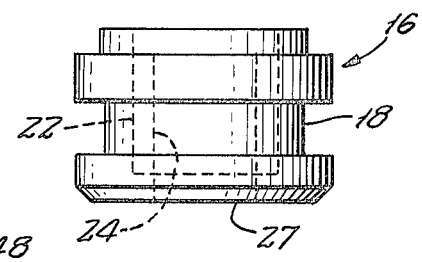
FIG. 3 is a side elevational view of the head wall which is mounted in one end of the casing of the pressure-sensitive transducer assembly shown in FIG. 1.

FIG. 3 illustrates the extension of these respective recesses 22, 24 and 26 in dotted outline while FIG. 6 clearly indicates the relative extension and parallel spacing of these same recesses. As an example, the three recesses or slots may be a quarter of an inch deep and a sixteenth of an inch in lateral width. As will be observed in FIGS. 2 and 4, the downwardly extending recess 22 is laterally longer than the recesses 24 and 26. As is illustrated in FIG. 2, the diameter of the flat end surface 27 in which the recesses 24 and 26 are positioned, is approximately 0.345 of an inch.

The central axially aligned downwardly extending recess 22 is adapted to house a pressure-sensitive transducer 30 in which a voltage is produced between the surfaces of a solid dielectric material 31 when a mechanical stress is applied to it. This effect, which can be described as the well-known "piezoelectric effect" has been found applicable to various polycrystalline ceramics whose most widely known member is probably barium titanate which, when pre-polarized by the application of a sufficiently strong unidirectional field, serves as an excellent transducing element. I have found that, for the application herein, lead zirconate titanate ceramic is the presently preferred material for the piezoelectric ceramic wafer or plate 31 for the transducer 30. As an example, the piezoelectric plate or wafer 31 may be 0.157 inches square with a thickness of 0.02 of an inch. This lead zirconate titanate is commercially available from E.B.L. Company, Inc., 91 Tolland Street, East Hartford, Connecticut under the commercial designation "Glennite" (Registered Trademark) ceramic composition No. G-1500.

Figure 7:
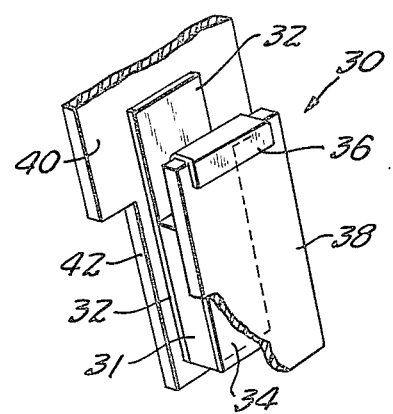
FIG. 7 is a perspective view, with parts broken away, of the pressure-sensitive transducer embodying the present invention.

The piezoelectric wafer 31 as is best shown in FIGS. 6 and 7 has a pair of electrodes 32 and 34 soldered thereto. The electrodes may comprise brass shim stock having a thickness of 0.002 of an inch. The electrode 34 has a solder tab 36 formed on its upper end. This solder tab 36 is bent over and extends down over the upper end of a small dielectric layer 38. The electrode 32 is bonded to a tongue 42 of a dielectric board 40 serving as a mounting and connector board. Electrical leads 44 and 46 (FIG. 6) are soldered respectively to the electrode 32 and to the solder tab 36 of the electrode 34. This entire transducer 30 is mounted in the centrally located downwardly extending axial recess 22 in the head wall 16. The tongue 42 of the dielectric board 40 and the dielectric layer 38 serve to insulate the electrodes 32 and 34 from the metallic head wall to prevent the short-circuiting of the piezoelectric wafer 31.

It will be noted that the neutral axis or plane of the wafer 31 extends parallel to the longitudinal axes of the pressure-sensing recesses 24 and 26, and accordingly the transducer 30 is not sensitive to axial acceleration caused by the firing of the air gun. The pressure surges caused by the firing of the air gun in effect squeeze the piezoelectric transducer 30 for producing the mechanical stress therein to generate a voltage.

As shown in FIG. 4, all three of the recesses 22, 24 and 26 are oval-shaped as seen in cross section and are parallely oriented. Thus, there are a pair of relatively thin portions 51 and 53 of the head wall which are located on opposite sides of the transducer 30. In effect, the transducer 30 is sandwiched between these thin wall portions 51 and 53 and is squeezed when these portions 51 and 53 are simultaneously deflected toward each other by a pressure surge. An epoxy potting material (not shown) fills the central recess 22 around the transducer 30, and therefore deflection of the thin-wall portions 51 and 53 (see also FIG. 6) toward each other immediately applies mechanical squeezing force to the transducer 30.

Figure 8:
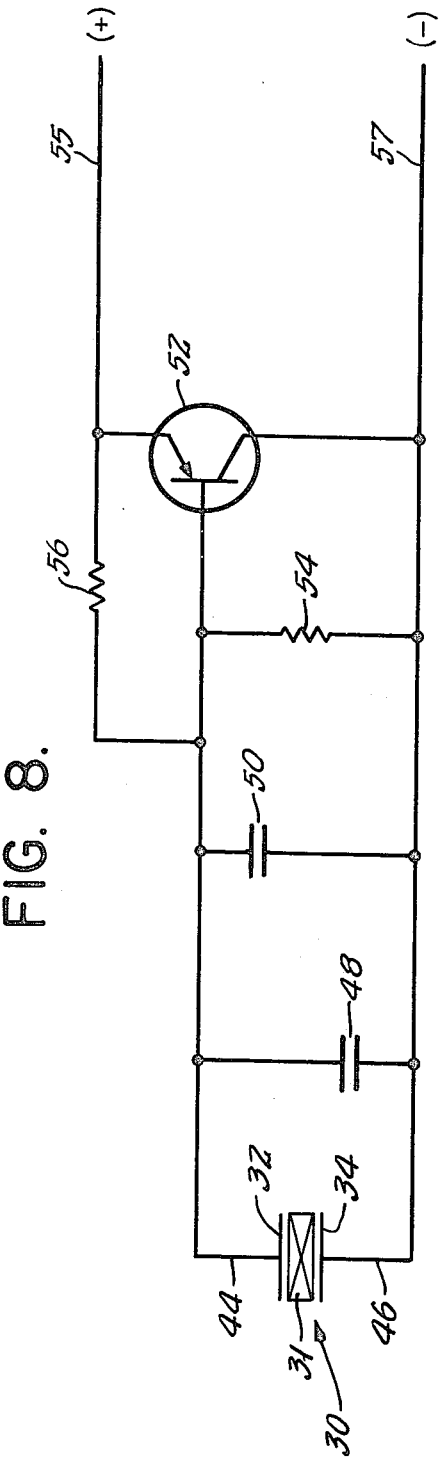
FIG. 8 is an schematic electrical circuit diagram of a transducer circuit employed in this embodiment of the present invention.

FIG. 8 provides an illustrative schematic electrical circuit diagram for the transducer assembly described. A tuning capacitor 48 is connected by leads 44 and 46 to the electrodes 32 and 34, respectively of the transducer 30. A trimmer capacitor 50 is coupled across the capacitor 48 which function together in parallel to set the sensitivity and frequency response of the piezoelectric transducer 30. An output of the transducer 30 is applied to the base of the transistor 52 which has biasing resistors 56 and 54 coupled between the emitter-base and collector-base junctions respectively of the transistor 52. A direct current (dc) power supply is connected by the leads 55 and 57 between the emitter and collector of the transistor 52. These various circuit elements are shown mounted on opposite sides of the circuit board 40 in FIGS. 1 and 5.

A regulated constant-current dc power supply (FIG. 9) provides an operating supply voltage to the circuit in FIG. 8. This power supply comprises a transformer 60 having a primary winding 62 for connection to 115 volt ac supply, and a 30 volt center tapped secondary winding 64. A pair of rectifiers 66 and 68 couple the secondary winding 64 through an RC network comprised of capacitor 70 and resistor 72 which filter the rectified output from the secondary prior to its application to a zener diode 74. The constant voltage output of the zener diode 74 is applied through a constant-current diode 76 to the plus and minus supply lines 55 and 57 leading to the transducer circuit of FIG. 8. An output coupling capacitor 80 is provided for coupling the output of transistor 52 to an indication and control circuit which provides information about the instant of firing. As an alternative to the power supply shown in FIG. 9, a battery may be provided which is coupled through a constant current diode 76 and is applied to the lines 55 and 57 to the transducer assembly of FIG. 8.

Figure 5:
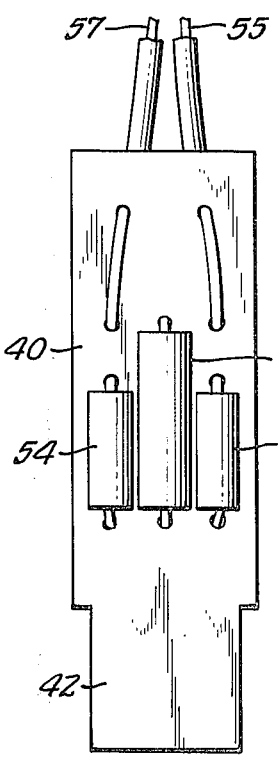
FIG. 5 is a plan view of the underside of the dielectric circuit mounting board of the transducer assembly shown in FIG. 1.

As an illustrative example, the values of the circuit components so described may be as follows:

Capacitor 48—0.01 microfarad
Capacitor 50—0.005 microfarad
Resistor 54—22 megohms
Resistor 56—3 megohms
Transistor 52—MPS A66
Capacitor 80—10 microfarad
Capacitor 70—100 microfarad
Resistor 72—470 ohms After the piezoelectric transducer 30 and the circuit elements described in FIG. 8 are mounted on the circuit board as is illustrated in FIGS. 1 and 5, the circuit connector board 40 is positioned within the sleeve casing 12 with the transducer 30 being positioned in the downwardly extending recess 22 of the cylinder end wall 16. The cap 14 closes the upper end of the housing 12 and an epoxy is used to completely encapsulate the circuit board 40 and the interior of the housing 12 with potting material 82 (FIG. 1) to insulate the various elements from the housing and to ruggedize the entire pressure-sensitive transducer assembly 10.

In operation when an air gun which the pressure-sensitive transducer assembly 10 is monitoring is fired, the fluid (usually air) in the recesses 24 and 26 which communicate with the air gun receive enormous surges of pressure from the air gun. This pressure deflects the thin wall portions 51 and 53 and thus is applied to both sides of the piezoelectric wafer 31 whose neutral axis or plane is parallel to the axis of the pressure sensing recesses 24 and 26. This pressure in effect squeezes the wafer 31 from both sides, thereby generating a voltage corresponding to the instant of firing of the air gun.

Figure 9:
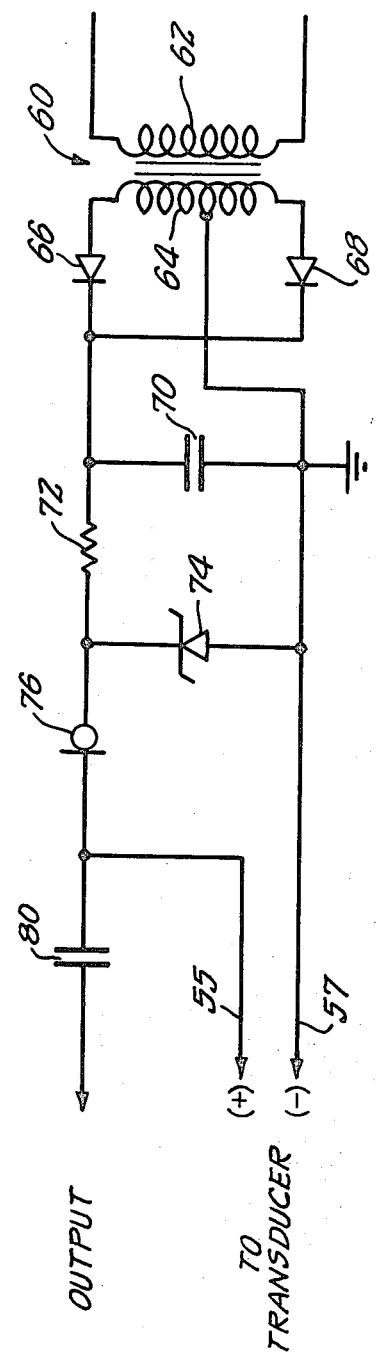
FIG. 9 is an schematic electrical circuit diagram of one form of power supply which may be used with the transducer circuit illustrated in FIG. 8.

The power supply circuit as shown in FIG. 9 provides a constant current in the lines 55, 57 and through the transistor 52. In this example, the circuit supplies approximately 4 milliamperes through the transistor 52. This transistor is so set that with this constant current flow there is a zero signal bias point voltage of approximately 12 volts appearing between the emitter and collector terminals.

When the transducer 30 responds to the pressure change, the voltage generated by the transducer effects the bias point of the transistor 52, thereby causing a variation (fluctuation) in voltage to appear across the emitter and collector terminals.

It is to be noted that the voltage gain of the transistor circuit is slightly less than unity, but the power gain is considerable and therefore the amplified output from the transducer is delivered to the lines 55 and 57 at a relatively low impedance level. Such a relatively low impedance level is very desirable in order to minimize line noise and to improve signal-to-noise ratio.

It is to be understood that other amplifier circuits capable of providing power gain at a relatively low impedance output can be employed in lieu of the circuit as shown in FIG. 8. For example, a Darlington configured transistor circuit can be employed.

Among the advantages of having both sides of the transducer 30 electrically isolated from "ground" is that interference from spurious electrical signals occurring in the environment is avoided. In other words stray pick-up from the environment is minimized.

In the present structure the alignment of the plane or netural axis of the transducer element with the axes of the pressure sensing passages communicating with the air gun negates response of the transducer to the acceleration force during the firing of the air gun. Accordingly, a complex multiple wafer arrangement to compensate for response to such acceleration is not required. Accordingly, the present invention enables a rugged, sensitive and simplified construction to be employed and provides a circuitry in which both of the signal transmission lines 55 and 57 are isolated from ground potential.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. A pressure-sensitive transducer assembly for determining the instant of firing of an air gun by sensing pressure changes occurring in the air gun when it is fired comprising:
   a casing,
   a head wall included in one end of said casing,
   recess means positioned in said head wall adapted to communicate with a passage leading into said air gun,
   a pressure-sensitive transducer mounted in said head wall adjacent to said recess means,
   said pressure-sensitive transducer having its neutral axis extending parallel to said recess means,
   whereby pressure variations in said recess means are transmitted through said head wall traverse to the neutral axis of said pressure-sensitive transducer for producing an electrical signal indicative of the instant of firing of the air gun.

2. The pressure-sensitive transducer assembly as set forth in claim 1 in which:
   said recess means includes at least one axially extending recess in said head wall.

3. The pressure-sensitive transducer assembly as set forth in claim 1 in which:
   said recess means comprises a pair of spaced parallel axially extending recesses which flank both sides of said pressure-sensitive transducer.

4. The pressure-sensitive transducer assembly as set forth in claim 2 in which:
   said pressure-sensitive transducer is mounted in an axially extending recess in said head wall,
   said latter recess extending into the head wall from the opposite side of said head wall than said recess means which communicates with said passage leading into the air gun.

5. The pressure-sensitive transducer assembly as set forth in claim 4 in which:
   said transducer comprises a wafer of piezoelectric material having electrodes mounted on opposite sides of said wafer,
   said electrodes being electrically insulated from the sides of said latter recess by dielectric layers, and
   said electrodes being in direct mechanical communication with the sides of said latter recess through said dielectric layers.

6. The pressure-sensitive transducer assembly as set forth in claim 5 in which:
   one of said dielectric layers is a tongue extension on a circuit mounting board on which electrical signal response circuitry for said transducer is mounted.

7. The pressure-sensitive transducer assembly as set forth in claim 5 or 6 in which:
   said material is lead zirconate titanate.

8. The pressure-sensitive transducer assembly as set forth in claim 6 in which:
   said response circuitry mounted on said dielectric board includes a capacitor and a trimmer capacitor coupled across said wafer of dielectric material for tuning the response of said transducer, semiconductor means connected to receive the output of said wafer and adapted to couple said output to a utilization circuit, and resistor means mounted on said board and coupled to said semiconductor means for providing a bias therefor.

9. A pressure-sensitive transducer assembly for determining the instant of firing of an air gun by responding to a sudden change in pressure occurring in the air gun at firing comprising:
   a sleeve casing,
   a cylindrical head wall mounted at one end of said casing,
   said head wall having a central downwardly extending recess therein,
   said head wall also having a pair of spaced parallel upwardly extending recesses flanking opposite sides of said central recess,
   said upwardly extending recesses being closely spaced to opposite sides of said central recess with a thin portion of said head wall being located between each respective recess of said pair and said central recess, said pair of recesses each being adapted to communicate with a passage leading to said air gun, thereby applying pressure changes occurring in said air gun to said upwardly extending recesses, and a pressure-sensitive transducer mounted in said central recess and being subjected to mechanical forces arising between said pair of spaced parallel recesses when a sudden change in pressure occurs therein.

10. A pressure-sensitive transducer assembly as claimed in claim 9 in which:

said pressure-sensitive transducer is subjected to mechanical squeezing action between said thin portions of said head wall arising when a sudden increase in pressure occurs simultaneously in said pair of recesses.

11. A pressure-sensitive transducer as claimed in claim 9 or 10 in which:

a dielectric connector board has a tongue extending therefrom, a pressure sensitive transducer comprises a wafer of piezoelectric material having a pair of electrodes mounted on opposite sides thereof, one of said electrodes being mounted on said tongue of said dielectric connector board, the other electrode having a dielectric layer secured thereto, said tongue and transducer being positioned in said central downwardly extending recess of said head wall with the neutral axis of said wafer of said transducer being parallel with said pair of upwardly-extending recesses, whereby pressure changes applied to said upwardly extending recesses squeeze said wafer which generates an electric signal indicating the firing of the air gun.

12. The pressure-sensitive transducer as set forth in claim 9 or 10 in which:

said central recess and said pair of parallel recesses flanking said central recess all are oval-shaped as seen in cross section, and said three oval-shaped recesses have their broad width dimensions oriented parallel with each other for defining a pair of thin parallel wall portions between which is sandwiched the transducer in said central recess.

13. The pressure-sensitive transducer as claimed in claim 9 or 10 in which:

said head wall is made of metal, and both sides of said transducer are electrically isolated from the respective sides of said central recess in which said transducer is mounted, thereby avoiding undesirable direct current paths from the transducer to "ground", whereby spurious electrical signals in the environment do not interfere with the desired signals from the transducer.

14. A pressure-sensitive transducer assembly for determining the instant of firing of an air gun by responding to a sudden change in pressure occurring in the air gun at firing comprising:

a head wall, said head wall having a central downwardly extending recess therein, said head wall also having a pair of spaced parallel upwardly extending recesses flanking opposite sides of said central recess, said upwardly extending recesses being closely spaced to opposite sides of said central recess with a thin portion of said head wall being located between each respective recess of said pair and said central recess, said pair of recesses each being adapted to communicate with a passage leading to said air gun, thereby applying pressure changes occurring in said air gun to said upwardly extending recesses, a pressure-sensitive transducer mounted in said central recess and being subjected to squeezing mechanical forces transmitted through said thin wall portions when a sudden change in pressure occurs in said pair of parallel recesses, and said transducer having its neutral axis oriented parallel to said pair of recesses, thereby avoiding response to mechanical accelerations occurring in the direction parallel to said pair of recesses.

15. A pressure sensitive transducer assembly as claimed in claim 14, in which:

said head wall has a cylindrical casing connected thereto extending rearwardly from said head, and said head wall is adapted to be mounted in a passageway with its front surface facing toward the fluid in said passageway wherein the surge in pressure will occur.

* * * * *